United States Patent
Potter, III et al.

(10) Patent No.: US 8,683,334 B2
(45) Date of Patent: Mar. 25, 2014

(54) SYSTEM AND METHOD FOR SHARING ACCESS TO SERVICE PROVIDER CONTROLS AND SUBSCRIBER PROFILE DATA ACROSS MULTIPLE APPLICATIONS IN A USER INTERACTIVE SYSTEM

(75) Inventors: Laurence Potter, III, Longwood, FL (US); Stephen A. Smith, Deltona, FL (US)

(73) Assignee: Intervoice Limited Partnership, Las Vegas, NV (US)

( * ) Notice: Subject to any disclaimer, the term of this patent is extended or adjusted under 35 U.S.C. 154(b) by 1287 days.

(21) Appl. No.: 11/208,041

(22) Filed: Aug. 19, 2005

(65) Prior Publication Data

US 2007/0044026 A1   Feb. 22, 2007

(51) Int. Cl.
*G06F 3/00* (2006.01)

(52) U.S. Cl.
USPC ........... 715/714; 715/743; 715/751; 715/727; 455/414.3; 455/415

(58) Field of Classification Search
USPC ......... 715/741, 743, 751, 727, 782, 778, 802; 451/414.3, 415
See application file for complete search history.

(56) References Cited

U.S. PATENT DOCUMENTS

| | | | |
|---|---|---|---|
| 4,905,181 A | 2/1990 | Gregory | |
| 5,327,529 A | 7/1994 | Fults et al. | |
| 5,485,370 A | 1/1996 | Moss et al. | |
| 5,608,789 A | 3/1997 | Fisher et al. | |
| 5,696,961 A | 12/1997 | Briscoe et al. | |
| 5,870,727 A | 2/1999 | St. Jacques et al. | |
| 5,883,939 A | 3/1999 | Friedman et al. | |
| 5,896,491 A | 4/1999 | Englefield | |
| 5,909,689 A | 6/1999 | Van Ryzin | |
| 5,920,725 A | 7/1999 | Ma et al. | |
| 5,920,870 A | 7/1999 | Briscoe et al. | |
| 6,014,502 A * | 1/2000 | Moraes | 709/219 |
| 6,018,571 A | 1/2000 | Langlois et al. | |
| 6,182,056 B1 | 1/2001 | St. Jacques et al. | |
| 6,192,514 B1 | 2/2001 | Lurndal | |
| 6,256,676 B1 | 7/2001 | Taylor et al. | |
| 6,279,016 B1 | 8/2001 | De Vorchik et al. | |
| 6,282,711 B1 | 8/2001 | Halpern | |
| 6,289,382 B1 | 9/2001 | Bowman-Amuah | |
| 6,330,554 B1 | 12/2001 | Alschuler et al. | |
| 6,424,988 B2 | 7/2002 | Lurndal | |
| 6,430,609 B1 | 8/2002 | Dewhurst et al. | |

(Continued)

OTHER PUBLICATIONS

Flach et al.; Architecture for the Interaction and Access on mulitplemedia database systems in the Context of Mobile Environments; © 2000; IEEE; p. 224-230.*

(Continued)

*Primary Examiner* — Linh K Pham
(74) *Attorney, Agent, or Firm* — Crowe & Dunlevy

(57) ABSTRACT

A control system and method is described having a framework in which many applications in a user interaction system (UIS) can share common data regardless of which application obtained the data and all without prior knowledge of the other applications. The shared data is typically personal data of the current user, such as name, location, preferences, etc. However, the system can also be used to share style sheets, announcements, etc., that can be utilized by multiple applications. The data is stored in a standardized manner in a location available to any application. Application's have access to the data based upon user privileges at any particular time.

7 Claims, 6 Drawing Sheets

(56) References Cited

U.S. PATENT DOCUMENTS

| | | | |
|---|---|---|---|
| 6,434,568 B1 | 8/2002 | Bowman-Amuah | |
| 6,438,594 B1 | 8/2002 | Bowman-Amuah | |
| 6,446,113 B1 | 9/2002 | Ozzie et al. | |
| 6,484,180 B1 | 11/2002 | Lyons et al. | |
| 6,559,773 B1 | 5/2003 | Berry | |
| 6,601,234 B1 | 7/2003 | Bowman-Amuah | |
| 6,606,660 B1 | 8/2003 | Bowman-Amuah | |
| 6,615,253 B1 | 9/2003 | Bowman-Amuah | |
| 6,629,129 B1* | 9/2003 | Bookspan et al. | 709/204 |
| 6,633,315 B1 | 10/2003 | Sobeski et al. | |
| 6,640,249 B1 | 10/2003 | Bowman-Amuah | |
| 6,658,466 B1 | 12/2003 | Ellestad et al. | |
| 6,665,725 B1 | 12/2003 | Dietz et al. | |
| 6,738,975 B1 | 5/2004 | Yee et al. | |
| 6,891,552 B1 | 5/2005 | Bush | |
| 6,920,607 B1 | 7/2005 | Ali et al. | |
| 6,948,135 B1 | 9/2005 | Ruthfield et al. | |
| 7,027,975 B1 | 4/2006 | Pazandak et al. | |
| 7,215,754 B1* | 5/2007 | Woodson et al. | 379/221.09 |
| 7,379,455 B2 | 5/2008 | Pickett | |
| 7,409,344 B2 | 8/2008 | Gurram et al. | |
| 7,561,872 B1* | 7/2009 | Koch et al. | 455/414.3 |
| 2002/0002688 A1 | 1/2002 | Gregg et al. | |
| 2002/0006117 A1* | 1/2002 | Duske et al. | 370/316 |
| 2002/0040352 A1 | 4/2002 | McCormick | |
| 2002/0075519 A1* | 6/2002 | Konsella et al. | 358/402 |
| 2003/0005432 A1 | 1/2003 | Ellis et al. | |
| 2003/0103075 A1* | 6/2003 | Rosselot | 345/717 |
| 2003/0171944 A1 | 9/2003 | Fine et al. | |
| 2003/0200371 A1* | 10/2003 | Abujbara | 710/305 |
| 2004/0073431 A1 | 4/2004 | Galanes et al. | |
| 2004/0098253 A1* | 5/2004 | Balentine et al. | 704/215 |
| 2004/0113938 A1 | 6/2004 | Akerfeldt | |
| 2004/0131081 A1* | 7/2004 | Bhatia et al. | 370/466 |
| 2004/0193420 A1 | 9/2004 | Kennewick et al. | |
| 2004/0230636 A1 | 11/2004 | Masuoka et al. | |
| 2005/0050301 A1 | 3/2005 | Whittle et al. | |
| 2005/0114066 A1* | 5/2005 | Kolman et al. | 702/119 |
| 2005/0183061 A1 | 8/2005 | Papanikolaou et al. | |
| 2005/0216847 A1* | 9/2005 | Zhu et al. | 715/751 |
| 2005/0266879 A1 | 12/2005 | Spaur et al. | |
| 2006/0056287 A1* | 3/2006 | Paden et al. | 370/225 |
| 2006/0059174 A1* | 3/2006 | Mese et al. | 707/100 |
| 2006/0083171 A1 | 4/2006 | Tanaike et al. | |
| 2006/0117264 A1* | 6/2006 | Beaton et al. | 715/751 |
| 2006/0129601 A1 | 6/2006 | Chang et al. | |
| 2006/0245576 A1* | 11/2006 | Henry | 379/265.01 |
| 2008/0228904 A1 | 9/2008 | Crespo-Dubie et al. | |

OTHER PUBLICATIONS

Meier et al.; A Framework for Integrating Existing and Novel Intelligent Transportation Systems; © 2005; IEEE; p. 650-655.*
U.S. Appl. No. 11/207,609, Carter et al.
U.S. Appl. No. 11/208,028, Potter et al.
International Search Report and the Written Opinion issued for PCT/US2006/031331, dated Jul. 26, 2007, 8 pages.
International Search Report and the Written Opinion of the International Searching Authority issued for PCT/US2006/031252, issued on Aug. 17, 2007; 15 pages.
International Search Report and Written Opinion issued for PCT/US2006/031632; Dated: Mar. 25, 2008; 9 Pages.
Final Office Action issued against U.S. App. No. 11/749,983 dated Jul. 22, 2010.
Office Action dated Nov. 29, 1020 for U.S. Appl. No. 11/208,028.

* cited by examiner

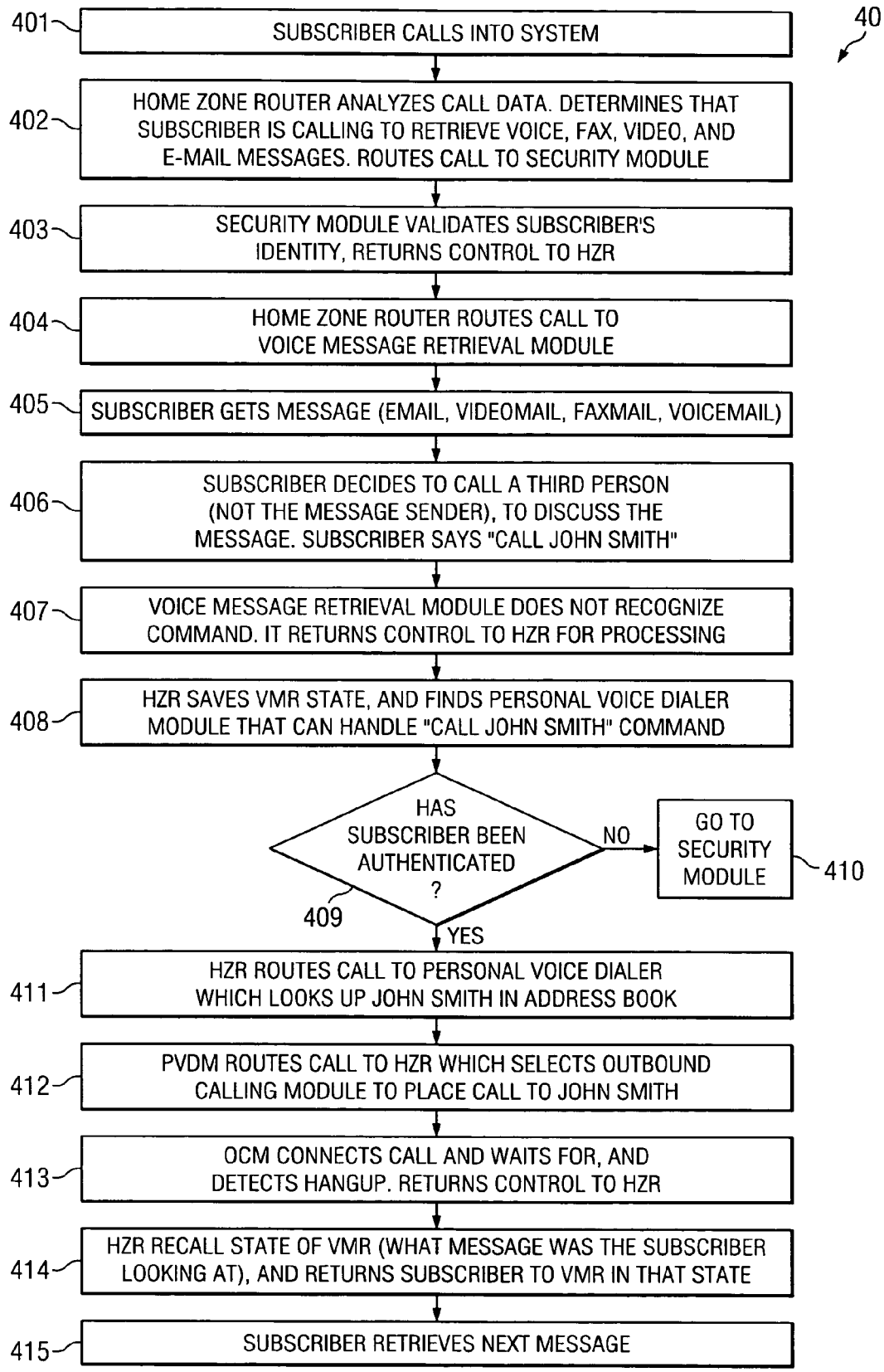

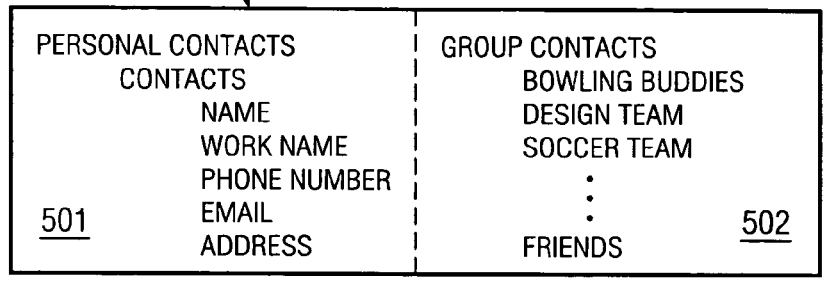
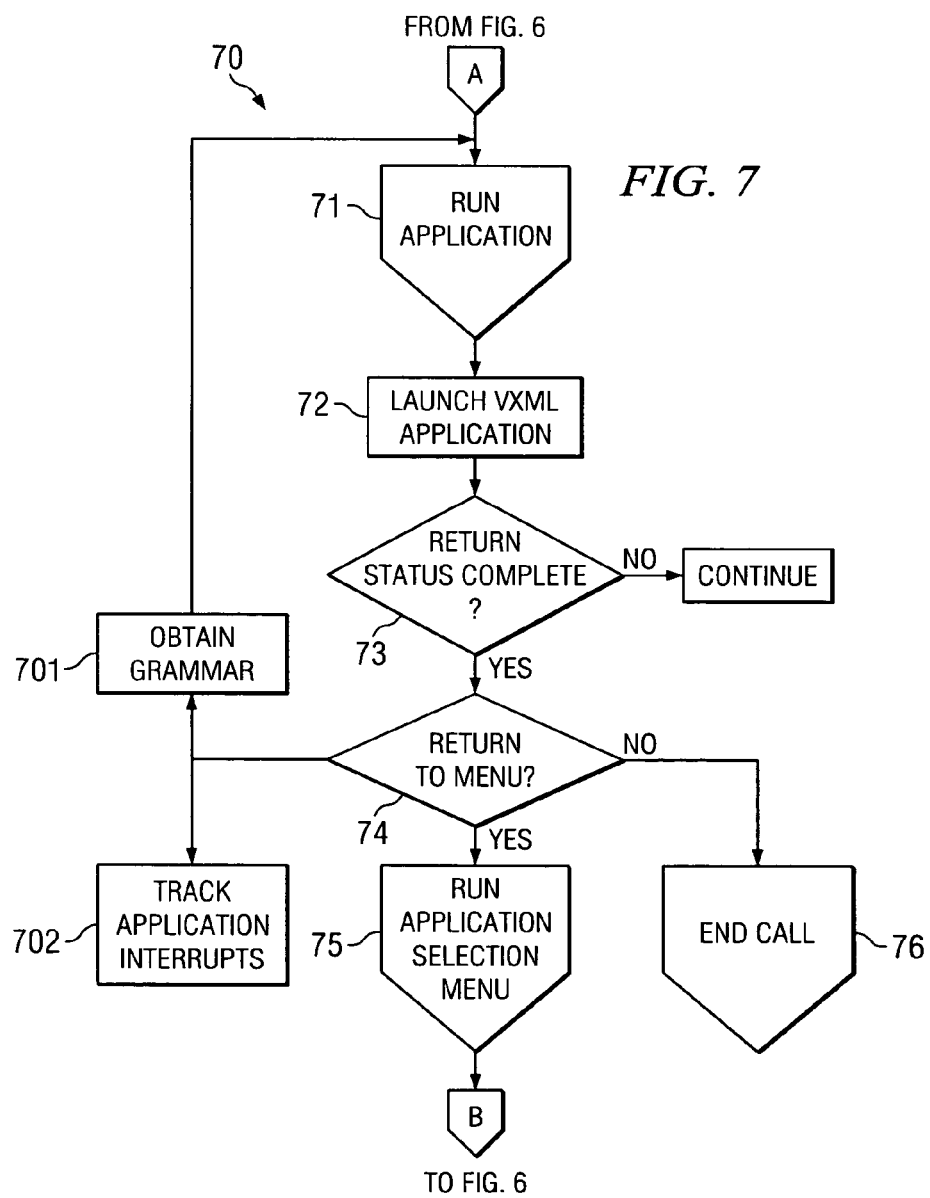

SYSTEM AND METHOD FOR SHARING ACCESS TO SERVICE PROVIDER CONTROLS AND SUBSCRIBER PROFILE DATA ACROSS MULTIPLE APPLICATIONS IN A USER INTERACTIVE SYSTEM

CROSS-REFERENCE TO RELATED APPLICATIONS

The present application is related to concurrently filed, co-pending, and commonly-assigned U.S. patent application Ser. No. 11/208,028, entitled "SYSTEM AND METHOD FOR INHERITANCE OF ADVERTISED FUNCTIONALITY IN A USER INTERACTIVE SYSTEM" and U.S. patent application Ser. No. 11/207,609, entitled "SYSTEM AND METHOD FOR ADMINISTERING PLUGGABLE USER INTERACTIVE SYSTEM APPLICATIONS," the disclosures of which are hereby incorporated herein by reference.

TECHNICAL FIELD

This invention relates to user interactive systems (UIS) and more particularly to systems and methods allowing users to share data across multiple applications without regard to which application provided the data.

BACKGROUND OF THE INVENTION

In computer systems, such as existing interactive response systems (IVR), it is customary to run applications which are independent from each other. Often, however, more than one application may be necessary to solve a particular user problem or to provide a particular service to a user.

Take, for example, IVR systems in which a user responds to a sequential series of prompts in order to obtain information, such as a ball score, weather forecasts forces, a banking balance, an airline reservation, etc. IVR systems, like other computer systems, are organized into applications with each application being specialized to perform a particular function. Each such application has associated with it its own grammar (whether voice based, browser based or multi-frequency, i.e., touch-tone, based) and thus sometimes it is necessary to use two or more applications in a single call or session with a user.

For example, if a user is asking about the ball score of a particular team a ball score application will be activated. If that user thereafter (or in the middle of the script thereof) asks about the weather (perhaps trying to decide whether to purchase tickets), the system will (as discussed with respect to the above co-pending and commonly-assigned U.S. patent application Ser. No. 11/208,028, entitled "SYSTEM AND METHOD FOR INHERITANCE OF ADVERTISED FUNCTIONALITY IN A USER INTERACTIVE SYSTEM", transfer the user to a weather application. The weather script will then prompt the user for certain information, including the user's identification and location, in order to provide the proper forecast. This is a waste of system resources as well as a waste of user time since the system either knew or could infer the location the caller was interested in (or at least to a high degree of probability). In this case the user is interested in the weather at the location of the sports event the user was inquiring about.

This is but one simple example of situations where a specific application in a multi-application framework requires data from (or about) a user that may have been already gathered by another application.

The problem is even further compounded when the various applications are not commonly designed at the same time or by the same designer. Several applications may be put into a system in a plug and play manner such that each application has no knowledge of the existence of other applications. When applications are constructed independently the designers do not know about the other applications and thus cannot easily (if at all) build proper inter-application "hooks" into these applications. Also service providers need a framework that allows a multi-application services platform to be deployed with a broad range of applications installed where the system can control the range of applications available to each subscriber.

SUMMARY OF THE INVENTION

A control system and method is described having a framework in which many applications in a user interaction system (UIS) can share common data regardless of which application obtained the data and all without prior knowledge of the other applications. The shared data is typically personal data of the current user, such as name, authorizations, location, preferences, etc. However, the system can also be used to share style sheets, announcements, etc., that can be utilized by multiple applications. The data is stored in a standardized manner in a location available to any application. Applications have access to the data based upon user privileges at any particular time.

In one embodiment, one application can obtain some useful data from a user or database over a communication path. The system structures the data such that it can be accessed by one or more other applications, without prior linking among the applications. The other applications can reference the data through a standardized interface and utilize it for their own purposes.

In one embodiment, applications from a plurality of vendors share the resources common to the control of the communication network. In addition, all of the applications can share information common to a user. Thus, if a user maintains an address book and the application calls for a phone number (or an e-mail address, etc.) from the address book there only need be one address book maintained by the user, (or one calendar), shared by all applications, regardless of the fact that the applications were designed and controlled by different design entities.

In one embodiment, a class of service (COS) is established for each subscriber and this COS controls the users' access to a defined subset of services. The COS data is shared with all applications plugged into the framework. Each new application is able to establish its own COS data elements required by its unique business logic which is then advertised and shared across applications within the framework. In this way new plugged-in applications are recognized as available for selection by the service provider to be added into newly defined COS or to be added to existing COS where they become immediately available to the subscribers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 4 illustrates one embodiment of navigation by grammar inheritance;

FIG. 5 illustrates an example of the address book; personal and group contacts; and FIGS. 6 and 7 illustrate one embodiment of a flowchart of system operation.

DETAILED DESCRIPTION OF THE INVENTION

Figure 1:
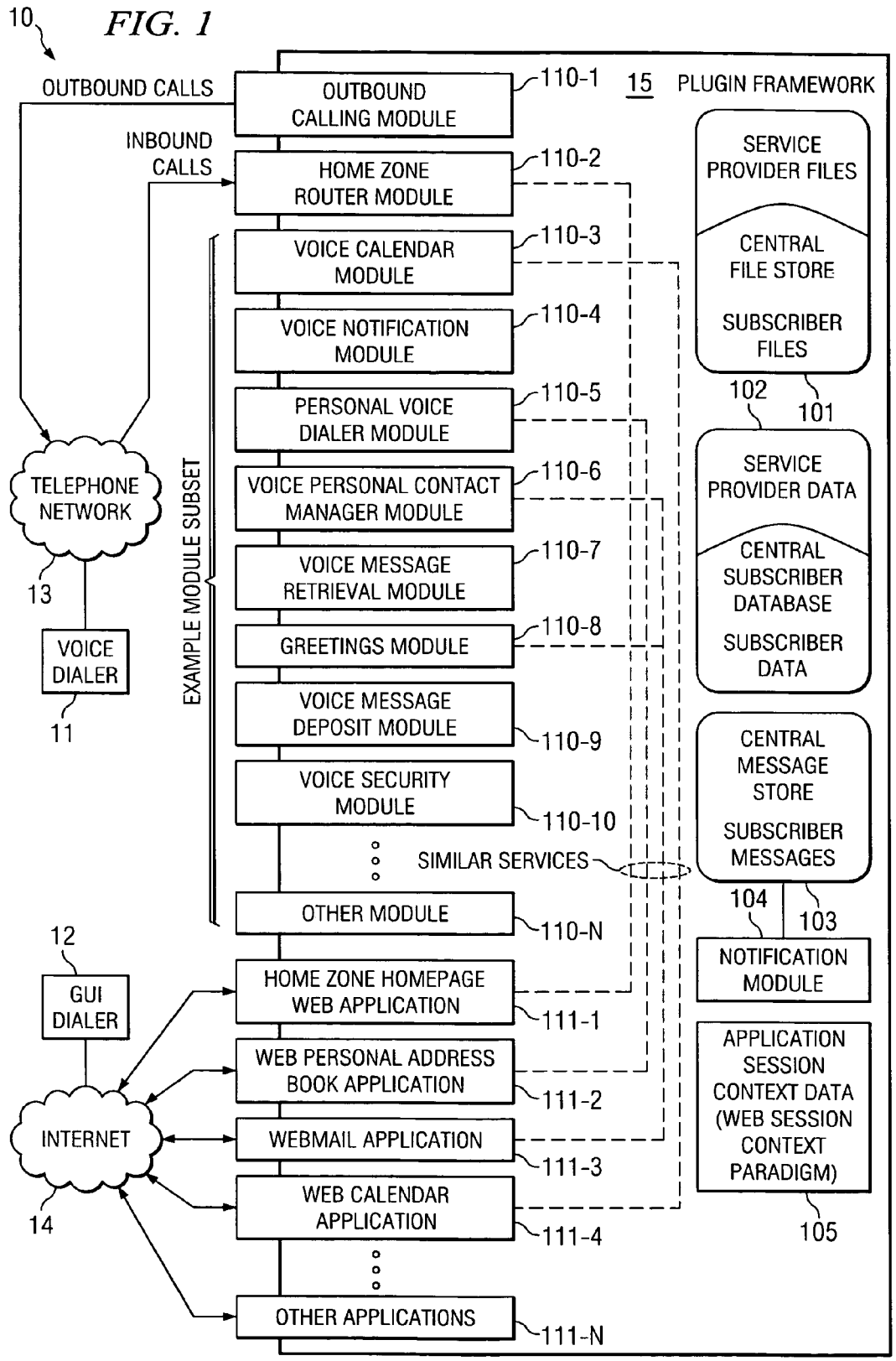
FIG. 1 illustrates one embodiment of a functional block diagram of a sample implementation of a user interactive system of the present invention.

FIG. 1, illustrates one embodiment 10 of a user interactive system having plug and play modules (applications), such as modules 110-1 through 110-N, and modules 111-1 through 111-N, available for use in providing interactive services for users. In the embodiment shown, voice and DTMF and other analog interactions are handled from users 11 and telephone network 13 while users with graphical devices (typically using a GUI interface) interact with system 10 via a digital packet network, such as Internet 14.

Users can access the UIS using a variety of interactive devices, such as, for example, telephone using voice, DTMF or other inputs, computer, PDA, etc., using a web browser, interactive TV, cell phone, etc.

The discussion that follows illustrates voice type applications using modules 110-1 through 110-N, but many, if not all, of the applications, including the control thereof, can be accomplished by appropriate interface applications 111-1 through 111-4.

System 10 is designed to allow applications to be added or removed from the system without prior knowledge of any other application. Thus, using the concept discussed, it is possible for different applications to be designed by different designers (and different vendors) without requiring reprogramming of any application. As will be discussed, there are at least these distinct operations, namely (1) provisioning the system for a user (or set of users); (2) advertising functionality of each application to other applications; and (3) shared access to both COS and subscriber profile data by all applications.

Figure 2A:
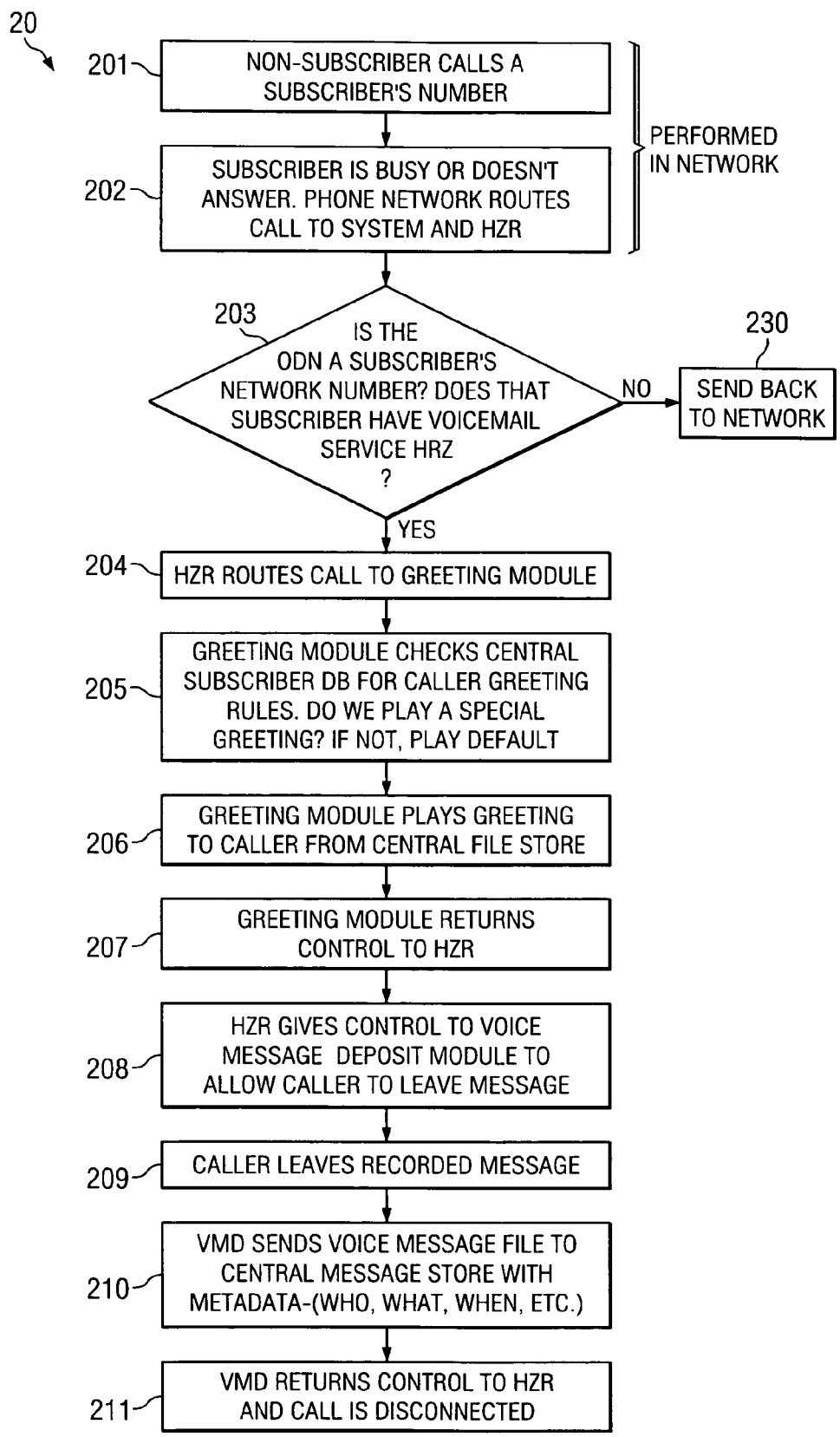
FIGS. 2A and 2B illustrate one embodiment of a flowchart of system operation.
Figure 2B:
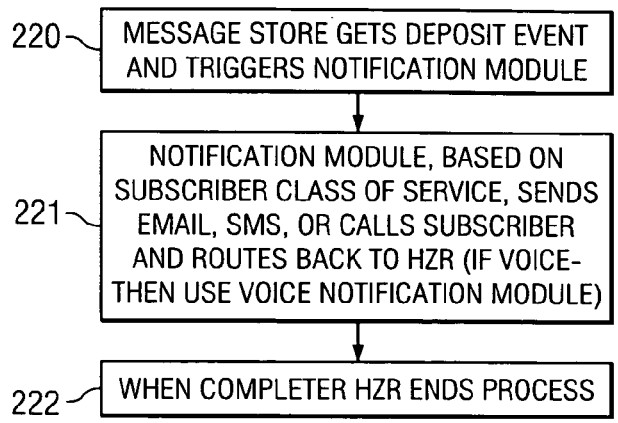

FIGS. 1, 2A, 2B describe the overall operation of the system, including all these operations. In operation, as shown in embodiment 20, FIG. 2A, when a non-subscriber calls a subscribers number, network 13 handles the call in the traditional manner. If the called subscriber does not answer (or is busy), the network (as shown in process 202) routes the call to system 10. The incoming call is routed to module 110-2 (called the home zone router module). For ease of discussion, the home zone router (HZR) module can be thought of as a central module and will be highly dependent upon access to the COS shared data. Process 203 performs a series of tasks, some of which are a determination of whether an original dialed number (ODN) is a subscriber's number. If it is, then the system needs to determine if the subscriber has voicemail services.

Figure 3:
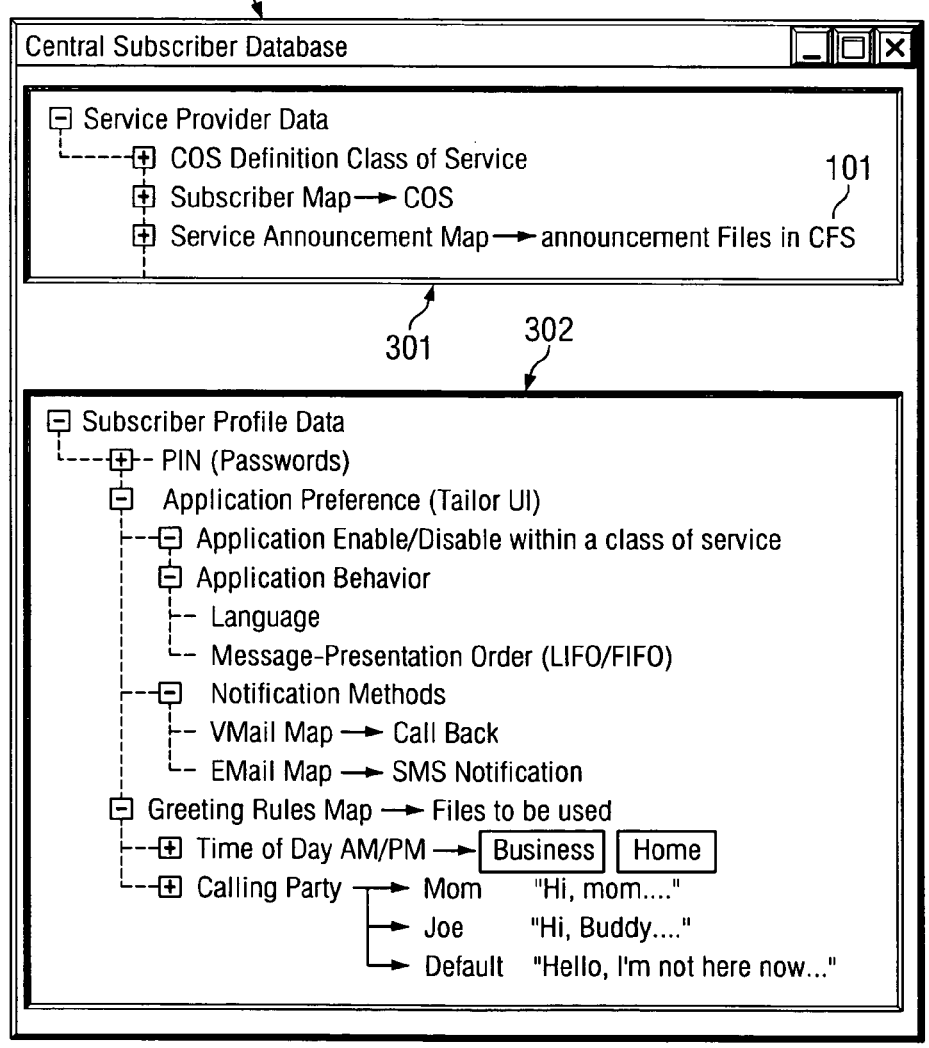
FIG. 3 illustrates one example of a central database used by all applications.

Once a positive determination is made, then HZR module process 204 connects the call to greeting module 110-8. This could be dependent upon whether the subscriber has custom greeting services available via the shared COS data. Greeting module 110-8, as shown by process 205, takes over control and checks central subscriber database 102 for the caller greeting rules pertaining to the called subscriber. One example of the central subscriber database is shown in FIG. 3 where section 301 is service provider data and section 302 is subscriber (profile) data. Depending on the data in section 302, process 206 plays the proper greeting as obtained from central file store 101. The files stored in the file store can be prerecorded by a professional, or by a user, and perhaps downloaded from a user's personal computer (PC).

Once greeting module 110-8 completes its task, process 207 returns control to home zone router (HZR) module 110-2 (which module acts as a control module) and process 208 gives control to voice message deposit (VMD) module 110-9 to allow the calling party to leave a message.

Process 209 receives the message and working in conjunction with process 210 stores the message in central message store 103 together with metadata pertaining to the call. The metadata can be, for example, time, calling party, length, special information, etc. When process 210 is finished, process 211 returns control back to HZR module 110-2 and the call is disconnected.

FIG. 2B illustrates the situation where, as shown in process 220, message store 103 has a message deposited (stored) therein. When this occurs, process 221, based on the subscriber's class of service (determined via the shared COS data), sends an email, an SMS message, or provides a voice message, indicating a message or provides the message, as desired by the user based on COS and the user's profile, as contained in central subscriber database 102 shown in FIGS. 1 and 3. If a voice call is to be made, module 110-4, in conjunction with module 110-1, are used to notify the subscriber. When the notification is complete, process 222 completes the call and the HZR ends the process.

As discussed above, all of the operations could be accomplished using applications 111-1 through 111-N, in which case home zone home page application 111-1 would perform similar to HZR module 110-2. Note that the data in central file store 101, in central subscriber database 102 in central message store 103 in application session context data 105, and as well as the control processors in notification module 104, are available to all applications and modules regardless from where the information was obtained. Thus, once data is gathered from one application, whether on a session by session basis (database store 105), or on a more permanent basis (database store 102) that information can be shared, regardless of where an application was put into the system, and without regard to who designed the application. Also note that there are two types of data; volatile—which is kept in application session context 105 (FIG. 1), and non-volatile—which is kept in the central subscriber database (FIG. 1). The volatile data includes the states of various applications, security, etc., and is similar to the web session data. The non-volatile data includes data, such as the subscriber's address book, which is kept permanently in the database. Application modules share both types of data, as discussed, in the file.

Note that while not the normal situation, there can be more than one application that can perform a specific function. In such a situation, the HZR can select which application to use for a particular function of a particular time. This selection can be made in conjunction with the user profile (such as, "always use a module from a particular vendor, if available" or "use a calendar application compatible with brand 'x' calendar").

FIG. 3 illustrates central subscriber database 102 having service provider data 301 and subscriber profile data 302. Some of the items within section 301 are class of service (COS) definitions established as an administrator; mapping of each subscriber to a COS definition and mapping of service announcement to announcement files in CFS 101. Some of the items within section 302 are subscriber PINS/Passwords; application preference, such as, which applications a subscriber wants (or does not want) within his/her COS; language; message presentation of order (LIFO/FIFO); notification methods; greet rules.

Using database 102, a subscriber has freedom of choice across many applications and can tailor the system to his/her likes and dislikes such that a change made while using one application (whether voice or GUI) will appear in other applications (whether voice or GUI).

Users can select the order of the function (order of a menu) desired and once that order is established for one application, the same order will apply to all modes of accessing the same (or similar) menus, whether the access is by voice, web server, video server, etc. While the user can specify an order of a prompt, the system can also statistically determine a preferred order and then apply the "interred" order across applications and across media entry types, and across pluggable applications, all without prior knowledge among applications. Note that the statistics can be generated from a user based on calls using all media types (voice, web, video, text, graphics, etc.). Thus, if a user always asks for his/her bank balance first regardless of media type access, then the bank balance is the preferred first menu choice. However, if a user uses voice response for balances but text messaging for bank listings, then the system provides balances when the user calls in via a phone, but should check listings when the same user accesses the system via a web browser using text.

FIG. 4 illustrates one embodiment 40 of a flowchart showing navigation by grammar inheritance. Process 401 begins when a subscriber calls into the system. Process 402 is controlled by HZR 110-2 (FIG. 1) and determines that the caller is trying to obtain something from the system, such as, a voice mail, e-mail, video, etc. The incoming call is routed to a security module, such as, module 110-10 (FIG. 1) which, under control of process 403, validates the subscriber and, as will be discussed, stores the validation in a session database for this subscriber.

Note that as far as web or PDA accesses goes, the explicit prompting has a direct equivalent in the web, by adding graphics or text explicitly showing the user what choices they have. If new apps are plugged in, new graphics or text menu items are added to the web page. However, implicit prompting is much harder to implement on the web. Web-based applications with fixed text or graphical menus, typically do not allow user selections outside of those presented on the screen. If the user has six menu items to choose from, with a radio button to select the choice, there isn't any way for the user to specify other arbitrary choices. An entry box could be provided to allow the user to describe other implicit choices, if desired.

For example, let us assume that a user is in the middle of an airline function (perhaps inquiring about a flight landing time) and the user decides to ask for weather conditions at a certain city. Today, it is usually the case that the application the user is interacting with does not contain a weather reporting function and thus cannot respond to the user request. In those situations, the user must exit the current application and then log into the proper application to obtain the desired information. Then the user must reactivate the original application and again enter all the desired information even though much if not all of that information had been entered in the prior session. This is a waste of the user's time as well as a waste of system resources.

The problem is further compounded when, as discussed in the co-pending, and commonly-assigned U.S. patent application Ser. No. 11/207,609, entitled "SYSTEM AND METHOD FOR ADMINISTERING PLUGGABLE USER INTERACTIVE SYSTEM APPLICATIONS," many vendors supply individual applications for use by a user, perhaps in a pluggable manner, and thus, the current application may not even "know" about an application that could handle the user's implicit prompt.

Returning to FIG. 4, process 404 then causes HZR 110-2 to route the call to voice message retrieval module 110-7 (FIG. 1) so that the subscriber can return his/her message under process 305 in the form set out in the subscriber's profile in database 102, as discussed above.

Assume now the subscriber decides to call a third party (not the party who left the message) to discuss the message. In such an event, the subscriber might say, "Call John Smith". If the personal voice dialer (PVD) service is within the subscriber's COS, then the PVD "advertised command grammar" would recognize the command "call" and try to determine what to do. Since retrieval module 110-7 does not recognize the command "call . . . ", it cannot comply with the direction. However, it can, and does, return temporary control of the session back to the HZR for further processing via process 407.

The home zone router saves the state of the existing session and finds the personal voice dialer 110-5 that can handle the command "call . . . ". The HZR selects personal voice dialer module (110-5) to handle the job of calling John. The personal voice dialer performs process 409 and it determines if this subscriber has been authenticated for performing this service. This then allows the authentication process to extend across multiple applications in a session, even when those applications are designed by different vendors and added to the system at different times. If process 409 determines that access has not yet been granted, or that further security is desired, then process 410 sends the subscriber to a security module, such as security module 110-10 (FIG. 1).

If the subscriber had been authenticated in a previous interaction with a module, that authentication would have been saved in the session data for this subscriber, and then the home zone router would route the call to the personal voice dialer selected which would then looking up "John Smith" in the address book for this subscriber. The address book would, for example, be located in central subscriber database 102 (FIG. 1). The personal voice module would then route the call back to the home zone router via process 410 which would select an outbound calling module such as module 110-1 to place the call to "John Smith" process 413 connects the call under control of the outbound call module and the text answer "hang-up" and other supervisory functions, and when the call is complete it is returned to the home zone router at process 414. The home zone router then recalls the state of the session, and more specifically determines what message the subscriber was listening to when the subscriber placed the third party call. The home zone router then returns the subscriber to the voice message retriever module in the same state that it was when the call was rerouted. The subscriber then retrieves the next message via process 415. This system then iterates through all the messages until there are no more messages and then turns to home zone router for completion of the session under control of the subscriber.

Note that processes 406-409 demonstrate how the home zone router can switch from module to module depending upon commands introduced by a subscriber or by a nonsubscriber. Which commands are not known to the specific application, but which are contained in a set of lists maintained under the command of the home zone router. These lists were compiled from time to time as new modules are placed into the system. The modules then advertise their availability and the words and interactions that they can perform so that the home zone router then, upon detecting a phrase or word or direction, can select an appropriate module for processing the call at that point.

For example, a person might be talking to a interactive application, for example, to book a flight to a vacation destination. The application may say "would you like to book the flight?" The expected responses, of course, are yes, no, maybe, but one expected response would not be "where is the hurricane?". Accordingly in traditional systems this cannot be processed, but in the system being discussed the phrase "where is the hurricane?" would be passed back to the home zone router because the application did not know what to do with the response, other than to pass it back to the home zone router. The home zone router would then look into its list and see which of the modules has advertised the fact that that module would handle the phrase "where is the hurricane?". The home zone router would then transfer control of the session to the module advertised to handle the phrase "hurricane". The subscriber would then hear a message that would say, "did you say, hurricane?". If the user answers yes, then that application would go on and process and provide the information to the user. When the user is finished, the user might say, "okay, I am ready to book my flight". The hurricane application would have no capability to understand, "book my flight", so it would return control to the home zone which would know that the subscriber desires to return to the application previous entered.

The home zone router could listen to the message from the subscriber and determine that the subscriber wants to go to another application, because perhaps the subscriber would like to know about his/her banking account. The home zone router could then provide such applications, and when they are finished they would return to the subscriber to the original application at the same point in the application where the subscriber left the application when the subscriber said, "where is the hurricane?". In this manner seamless operation between different applications designed by different designers at different times is available even though the applications do not know about the existence of the other applications.

Process 411 routes the call to personal voice dialer 110-5 which then looks up "John Smith" in database 102. The personal address book of the subscriber, such as address book 502 (FIG. 5), of database 102 (FIG. 1). Note that address book 500 for this subscriber is available for use by all applications 110-1 to 110-N and 111-1 to 111-N (FIG. 1).

Once the calling number (or other identification) is obtained from the personal book of the subscriber (or from a common location for certain names), process 412, under control of the HZR, selects an outbound calling module, such as module 110-1, and places the call through the network to "John Smith".

Process 413 monitors the call for termination and when the call is finished, system (framework) control goes back to the HZR which then, under process 414 recalls the state of the session and returns the subscriber to where the subscriber was, i.e., in VMR module 110-7, for continuation of the message retrieval process (process 415) that was interrupted when the subscriber asked to "call John Smith".

FIG. 5 shows one embodiment of one portion of central subscriber database 102. In this example, the portion is address book 500 constructed on a subscriber-by-subscriber basis but which is utilized by many applications, whether those applications are applications designed for voice or designed to be used through the digital environment. In the embodiment shown, the address book is divided into two sections 501 and 502, by way of example. In section 501, the contact information is for individuals' name, nickname, phone number, email and address. Section 502, shows group contacts where several of the contacts of section 501 can be combined to form groups in a conventional way.

When information is entered into an address book, the system constructs indexes, for example, name index, email index, and address index, so that when, for example, an email name is presented, the system can find the email name and instead of the system displaying an email name, could display the nickname, the proper name, or any other form, dependent upon the manner of access of the system. Thus, for example, a message could come into the system as an email address, but when the message is reported to a subscriber via a voice connection, instead of telling the subscriber the email address, the system would tell the subscriber the name as determined from the index. Thus, while information is populated into the central database from various applications, as well as accessed by various applications, it is arranged such that each application can ask for and receive the type of information it desires based upon the application type, class of service, and preferences of a subscriber.

This indexes from grammars so that when a subscriber says call "John Smith", the system can look into its name index grammar, find the name John Smith, and retrieve a phone number, an email, or whatever is appropriate at that time for further processing the session with the subscriber. As discussed, the information pertaining to the subscriber is shared across all applications plugged into the system at the time of usage.

Figure 6:
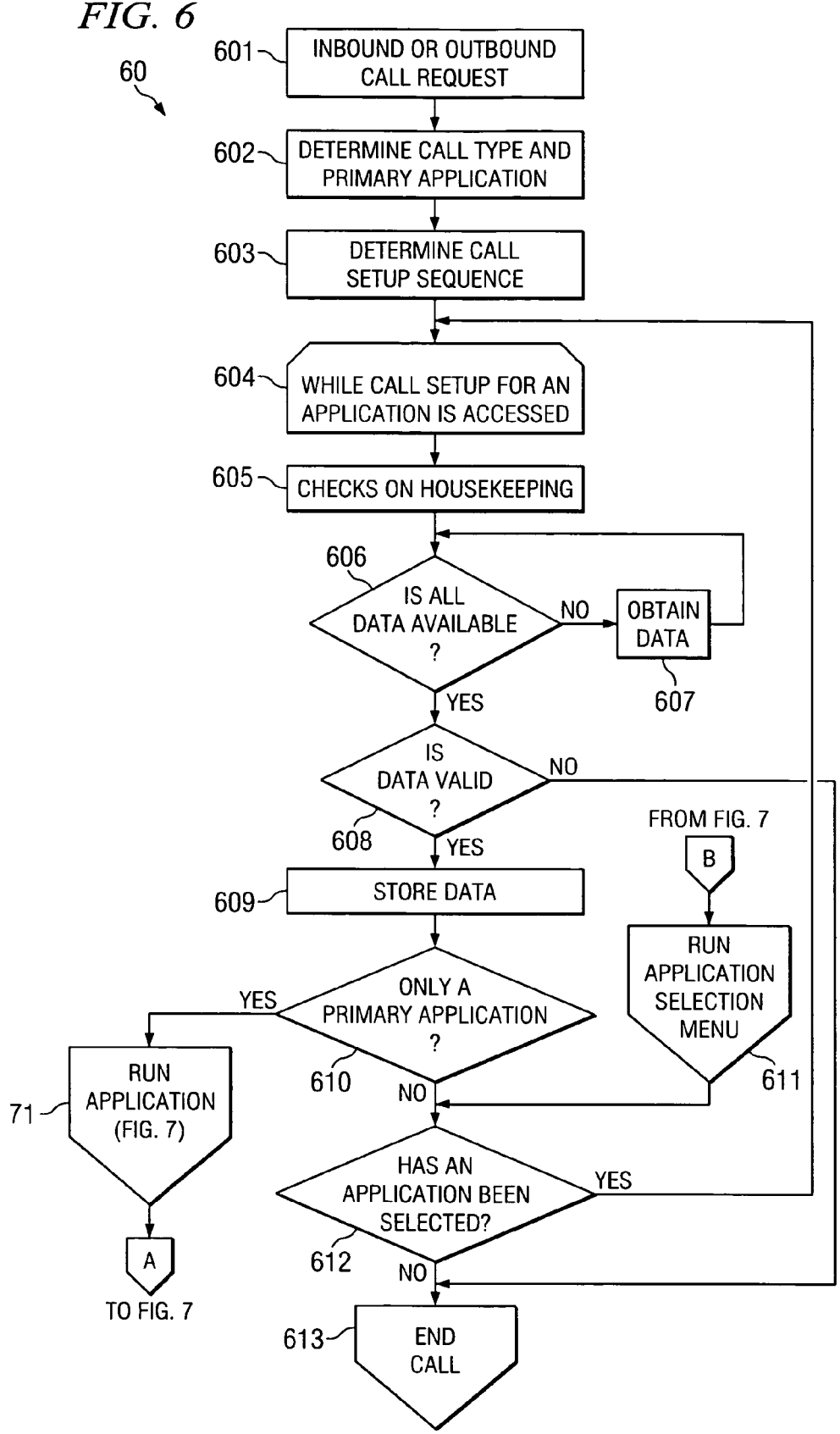

FIG. 6 shows one embodiment 60 of call flow control. In this embodiment, a user is first validated using information retrieved from data stores 101, 102 (FIG. 1). Once validated, session context data is updated so the information can be shared with other applications. Next, the user interfaces with two applications. The first application collects and stores a piece of information, the second application reads that information.

Process 601 is a call request received by the system usually to/from a user. The call request is passed, with information about the call, to process 602 which generates the call type using a primary application, such as, for example, "security".

Process 603 determines the call set-up sequence for the selected primary application. While this process is being accessed, processes 604, 605, 606, 607, 608, and 609 gather and check security and other access data using shared user data to validate the subscriber. Once validated, a security object is stored in session context data and this validated data can be accessed by other applications so that each application accessed by this user for this session can be assured that the user is a valid user. The gathered data is stored either in data store 102 (FIG. 1) or data store 105 (FIG. 1) depending on the information type, i.e., "permanent" or "session only". If the user is not validated (process 608), the session is ended and the session context data is destroyed.

If process 610 determines that this session is only for running a primary application, then the application is run via process 71 (FIG. 7). If, however, the user has access to the main menu, or if directed from FIG. 7, process 611 presents a menu for the user and process 612 controls the selection of the desired application.

The selection of an application causes the iteration of processes 604-610 and the selected application is run via process 71 and FIG. 7. The menu could be displayed, or could be presented with spoken prompts, and the menu can be explicit, i.e., actual choices given to a user or could be "implicit" in that the data came from the user without an actual prompt, as discussed above.

FIG. 7 shows one embodiment 70 of a call flow control for running an application. The application illustrated is, by way of example, a voice call and process 71 (from FIG. 6) causes process 72 to launch a VXML application. Process 73 monitors the progress of the application and when the progress indicates something else must be done (such as, for example, obtain a different grammar), process 701 causes process 702 to provide the new grammar. Process 703 tracks the interrupt to be sure it is handled properly.

When process 73 returns a "status complete" indication process 74 either runs a menu selection application (process 75), or ends the call (process 76).

If a new grammar is needed, then process 702 obtains the grammar from a grammar store (for example, from store 50, FIG. 5), and the application is run via process 71 (or continued under control of process 703).

Voice applications (which are only one possible mode of information exchange) typically would use voice extensible markup language (VXML) documents fetched by a web server. As such, each has an associated http session. When the HZR is launched, the http session identifier is used to access scripts. These scripts include JSP scripts used to access shared data and VXML scripts which are the embodiment of advertised plug-and-play applications. The result is that each script launched shares a single http session.

A feature of the http session instance is that data may be stored as an object in a single http session object, thus allowing scripts in this environment to share data as long as it is stored in a well known manner. This is done by providing scripts developed to read and write http session object data as advertised functions of plug-and-play applications.

Objects are stored in the http session object as key value pairs. Keys for shared data must be well known so that any application which needs to access the data has the knowledge to access the data. A set of standard keys are defined as part of the system framework. If an application stores data in a specific key, all other applications can access that data by requesting that key. This is the primary concept for data sharing in the UIS.

| Key | Description |
| --- | --- |
| Subscriber | Subscriber object retrieved from data store representing the current subscriber. |
| ServiceProvider | Service provider object retrieved from data store representing the service provider of the current user. |
| ApplicationName | The name of the application currently executing. |

-continued

| Key | Description |
| --- | --- |
| AParty | The current user's account number, typically the calling party number. |
| BParty | The called party number which resulted in the user starting the current session. |
| RedirectNumber | The last redirecting number which resulted in the user starting the current session. |
| RedirectingReason | The reason for the last redirect. |
| ClassOfService | Class of service object associated with the current user. |
| Language | String representing the current user's language preference. |
| Persona | String representing the current user's persona preference. |
| GrammarMode | String representing the current grammar interface (voice, touchtone, etc.) |

Applications may also store data for later use. For example, an application which collects data from a user may exit, only to be executed again during the same session. It would be desirable not to request the same information from the user upon reentry into the application. Therefore, the application might store data in the http session object using a unique key. Upon execution, the application would query the http session object for the existence of said data.

Further, applications can share data with another application by coordinating the storage of said data. For example, two similar applications are being developed which require the same data. The authors of these applications agree on a key used to store data. Whichever application is executed first will collect and store the information using the agreed upon key. The second application executed, when it queries for data associated with the agreed upon key will find the data already stored and therefore does not require it to be collected a second time.

Shared data may also exist in data stores 101, 102, 103, and 105 (FIG. 1). This data may be stored in a database, flat text files, etc. Business objects are developed which access this data and are provided for use in developing scripts. These business objects define the data they access as well as providing data access methods. These business objects provide a user context interface which allows access to certain data, which can be shared among applications.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A user interactive system (UIS), said system comprising:
means for accepting a previously undefined data field and corresponding data by at least a first one of a plurality of UIS applications in response to one or more user commands; and means for storing said data and advertising said data to the plurality of UIS applications; and means for allowing a second one of the plurality of UIS applications to share said accepted data without regard to which application accepted said data and without prior coordination between the first one and the second one of the UIS applications, wherein said data is not collected a second time when said data is already stored; and means for selecting a compliant one of said plurality of UIS applications, which advertises itself as complying with said data, for complying with said data when a third one of said plurality of UIS applications cannot comply with one of said user commands, wherein said means for selecting comprises a list of said user commands to which said plurality of UIS applications advertise themselves as operable to comply; and means for updating said list of said user commands when a UIS application is added to said system.

2. The system of claim 1 wherein said data is accepted in a contextual setting and wherein said allowing means uses said contextual setting to facilitate said sharing.

3. The system of claim 2 wherein said data is data received from an application user.

4. The system of claim 3 wherein said data received from said user is for only a particular session.

5. The system of claim 1 wherein said UIS applications are selected from the list of application types, including web-based, phone based, interactive TV based.

6. The system of claim 5 wherein data is shared among said application types.

7. A method of operating a user interactive system (UIS), said method comprising:

accepting a previously undefined data field and corresponding data from at least a first one of a plurality of UIS applications;

storing said accepted data in one of a plurality of databases accessible by the plurality of UIS applications;

allowing a second one of the plurality of UIS applications to retrieve and use said accepted data for processing without regard to which application accepted said data and without prior coordination between the first one and the second one of the plurality of UIS applications; wherein said data is not collected a second time when said data is already stored;

selecting a compliant one of the plurality of UIS applications, which advertised itself as complying with said data, for complying with said data when a third one of said plurality of UIS applications could not comply with one of said user commands, wherein said selecting comprises choosing from a list of said user commands to which said plurality of UIS applications advertise themselves as operable to comply; and updating said list of said user commands when a UIS application is added to said system.

* * * * *